United States Patent
Lin

(10) Patent No.: US 7,130,642 B2
(45) Date of Patent: Oct. 31, 2006

(54) METHOD AND APPARATUS FOR PERFORMING POSITION DETERMINATION IN A WIRELESS COMMUNICATION NETWORK WITH REPEATERS

(75) Inventor: Ie-Hong Lin, Fremont, CA (US)

(73) Assignee: Qualcomm Incorporated, San Diego, CA (US)

( * ) Notice: Subject to any disclaimer, the term of this patent is extended or adjusted under 35 U.S.C. 154(b) by 139 days.

(21) Appl. No.: 10/792,162

(22) Filed: Mar. 2, 2004

(65) Prior Publication Data

US 2004/0219930 A1    Nov. 4, 2004

Related U.S. Application Data

(60) Provisional application No. 60/452,182, filed on Mar. 3, 2003.

(51) Int. Cl.
*H04Q 7/20*    (2006.01)
*G01S 1/00*    (2006.01)

(52) U.S. Cl. .................. 455/456.1; 455/456.3; 455/456.6; 342/357.01; 342/357.02; 342/357.08

(58) Field of Classification Search ............. 455/456.1, 455/456.3, 456.6, 414.2, 422.1, 435.1, 435.2; 342/357.01, 357.02, 357.12, 357.08, 450
See application file for complete search history.

(56) References Cited

U.S. PATENT DOCUMENTS 6,169,497 B1 *  1/2001  Robert ...................... 340/988
6,275,707 B1 *  8/2001  Reed et al. ............... 455/456.3
2002/0005804 A1 *  1/2002  Suprunov ................... 455/456
2002/0155838 A1 * 10/2002  Durrant et al. ............. 455/445
2002/0163901 A1 * 11/2002  Spratt ......................... 370/338

FOREIGN PATENT DOCUMENTS

| EP | 0814627 | 12/1997 |
| WO | 02059638 | 8/2002 |
| WO | 02087275 | 10/2002 |

\* cited by examiner

*Primary Examiner*—Joseph Feild
*Assistant Examiner*—Huy D Nguyen
(74) *Attorney, Agent, or Firm*—Philip Wadsworth; Bruce Greenhaus; James McFarland

(57) ABSTRACT

A method and apparatus to perform position determination in a wireless (e.g., cellular) communication network with repeaters. A signal received by a terminal is initially identified as being from a repeater. A position and a position uncertainty for the identified repeater are obtained (e.g., from a repeater database) and provided as the position estimate and position uncertainty for the terminal if (1) a more accurate position estimate for the terminal cannot be obtained, (2) the terminal is deemed to be in an indoor environment, or (3) the terminal is located sufficiently close to the identified repeater. If information for additional delays associated with the identified repeater is available, then the position estimate for the terminal may be derived based on a "compensated" time measurement for the identified repeater (i.e., with the additional delays removed) and time measurements for at least two other transmitters received by the terminal.

20 Claims, 4 Drawing Sheets

METHOD AND APPARATUS FOR PERFORMING POSITION DETERMINATION IN A WIRELESS COMMUNICATION NETWORK WITH REPEATERS

RELATED APPLICATIONS

This application claims priority to U.S. Provisional Application No. 60/452,182, filed on Mar. 3, 2003.

BACKGROUND

1. Field

The present invention relates generally to position determination, and more specifically to a method and apparatus for performing position determination in a wireless communication network (e.g., a cellular network) with repeaters.

2. Background

A common technique to determine the position of a terminal is to ascertain the amount of time required for signals transmitted from multiple transmitters at known locations to reach the terminal. The propagation times for the signals are typically converted to "pseudo-ranges", which are estimates of the distances between the terminal and the transmitters. The position of the terminal may then be estimated based on the pseudo-ranges to the transmitters and their locations, using a process often referred to as "trilateration".

One system that provides signals from a plurality of transmitters (satellites) at known locations is the well-known Global Positioning System (GPS). An accurate three-dimensional position estimate (or "fix") for a terminal may be obtained based on signals received by the terminal from a sufficient number of GPS satellites (typically four). However, the required number of GPS satellites may not be available in certain operating environments (e.g., indoors) to derive this fix. Another system that provides signals from a plurality of transmitters (base stations) at known earth-bound locations is a wireless (e.g., cellular) communication network. A two-dimensional (2-D) position estimate for a terminal may be obtained based on signals received by the terminal from a sufficient number of base stations (typically three or more).

Many cellular networks employ repeaters to provide coverage for designated areas within the network or to extend the coverage of the network. For example, a repeater may be used to cover a geographic area that is not covered by a base station due to fading conditions (i.e., a "hole" within the network). Repeaters may also be used to extend coverage into rural areas (e.g., along a freeway) that are outside the coverage area of the base stations. A repeater receives, conditions, and retransmits signals on both the forward and reverse links. The forward link refers to the communication link from the base stations to the terminals, and the reverse link refers to the communication link from the terminals to the base stations.

Various challenges are encountered in determining the position of a terminal in a network that employs repeaters. On the forward link, each repeater transmits a repeated signal at high power and with additional delays to the terminals within its coverage area. A terminal located within the coverage area of a repeater is often prevented from receiving signals from base stations due to a combination of the repeated signal's high power plus the isolation normally associated with the repeater's coverage area. Moreover, in many instances in which repeaters are used (e.g., inside buildings, tunnels, subways, and so on), signals from GPS satellites have insufficient power levels and also cannot be received by the terminal. Thus, a limited number of signals (possibly only one signal, from a repeater) may be available for use to determine the terminal's position.

Furthermore, the additional delays introduced by repeaters can distort measurements made by a terminal for signals received from the repeaters. Consequently, measurements for signals received from repeaters are normally discarded and not used for position determination. In certain situations, only few measurements may be available to compute the position estimate for the terminal. If signals from repeaters are discarded, then the accuracy of the position estimate obtained based on remaining signals may be very poor.

There is therefore a need in the art for a method and apparatus to provide a position estimate for a terminal in a wireless communication network that employs repeaters (or other transmission sources with similar characteristics).

SUMMARY

A method and apparatus is provided herein to perform position determination in a wireless communication network (e.g., a cellular network) with repeaters. The method and apparatus utilize a repeater database that contains various types of information for repeaters in the network, as described below. A position estimate for a terminal may be obtained based on (1) measurements made by the terminal for signals received by the terminal, (2) information in the repeater database, and (3) other information that may be available.

In accordance with one embodiment of the disclosed method and apparatus, to perform position determination in the network with repeaters, a signal received by the terminal is initially identified as being from a repeater. The position of the identified repeater is obtained (e.g., from the repeater database) and provided as the position estimate for the terminal if a more accurate position estimate for the terminal cannot be obtained. A position uncertainty for the identified repeater may also be obtained (again, from the repeater database) and provided as the uncertainty in the position estimate for the terminal. It may not be possible to obtain the more accurate position estimate for the terminal due to various reasons such as, for example, (1) lack of information for the additional delays associated with the repeater and/or (2) lack of a sufficient number of measurements required to perform trilateration for the terminal.

A determination may also be made whether the terminal is in an indoor or an outdoor environment. A determination may further be made whether the terminal is located sufficiently close to the identified repeater. This may be achieved by comparing the received signal strength for the identified repeater against a threshold. The position of the identified repeater may also be provided as the position estimate for the terminal if the terminal is deemed to be (1) in an indoor environment or (2) located sufficiently close to the identified repeater (i.e., the received signal strength exceeds the threshold).

If information for the additional delays associated with the identified repeater is available, then the time measurement reported by the terminal for this repeater may be processed to remove the additional delays. The more accurate position estimate for the terminal may then be derived based on the "compensated" time measurement for the identified repeater (i.e., with the additional delays removed) and time measurements for at least two other transmitters received by the terminal.

Various aspects and embodiments of the invention are described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
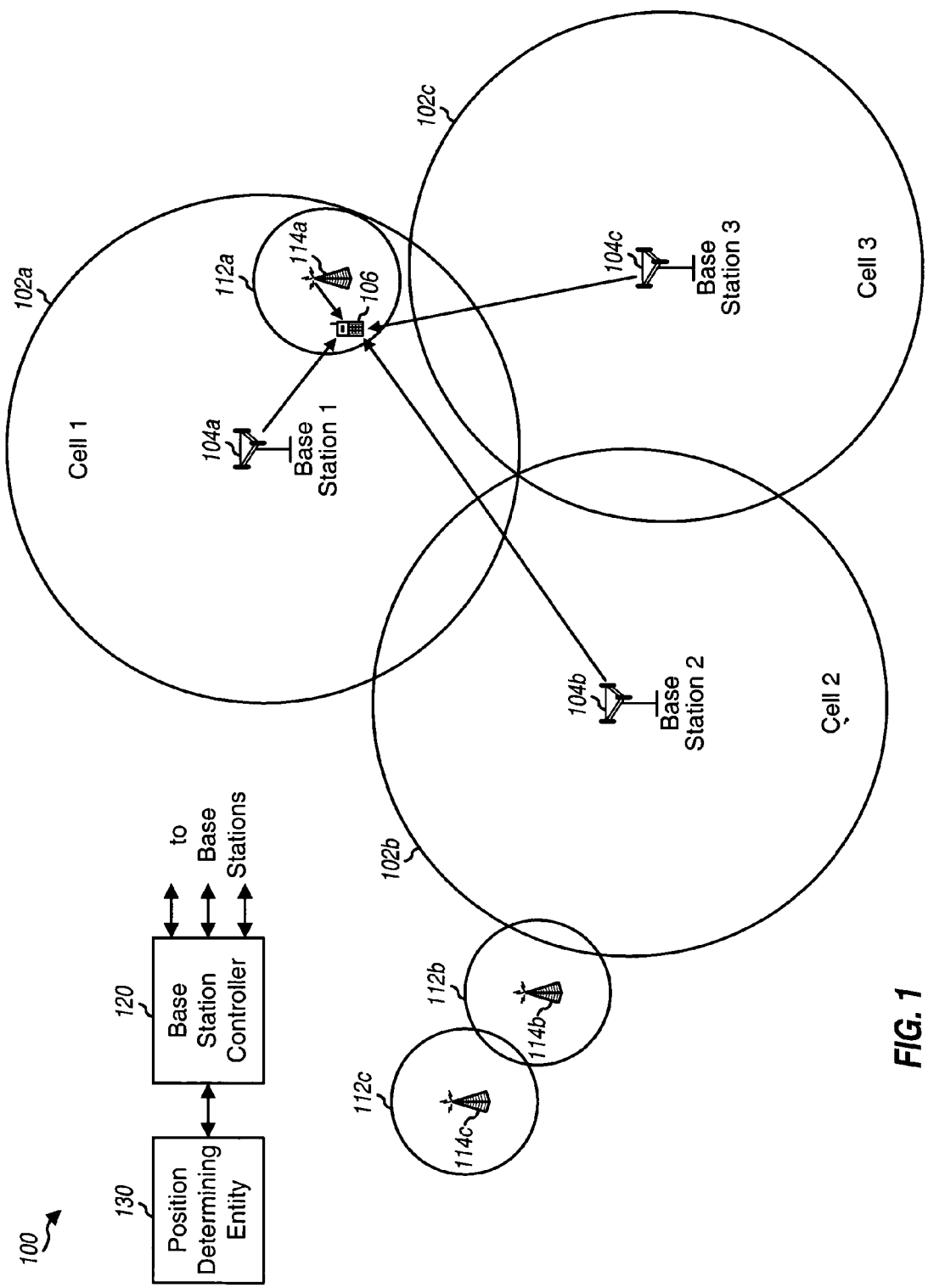
FIG. 1 shows a wireless communication network with repeaters.

FIG. 1 shows a diagram of a wireless communication network 100 with repeaters. Network 100 may be a cellular network that may support one or more CDMA standards (e.g., IS-95, IS-2000, W-CDMA, and so on) and/or one or more TDMA standards (e.g., GSM). All of these standards are well known in the art. Network 100 may include a number of base stations 104. However, for simplicity, only three base stations 104a, 104b, and 104c are shown in FIG. 1. Each base station 104 serves a particular coverage area 102 and provides communication for terminals 106 located within its coverage area. A base station or its coverage area, or both, are often referred to as a "cell", depending on the context in which the term is used.

Repeaters 114 may be deployed in network 100 to provide coverage for regions that would not otherwise be covered by base stations 104. For example, repeaters 114 may be deployed in areas where reception of signals from base stations 104 is poor, such as region 112a in FIG. 1. The poor reception may be due to fading conditions or some other phenomena. Repeaters 114 are also commonly deployed within buildings to improve indoor coverage. Repeaters 114 may also be used to extend the coverage of network 100, such as regions 112b and 112c in FIG. 1. In general, repeaters are more cost effective than base stations, and may be advantageously deployed where additional coverage is desired but additional capacity is not required. Any number of base stations within the network may be repeated, depending on the network deployment.

A number of terminals 106 may be dispersed throughout the network. For simplicity, only one terminal 106 is shown in FIG. 1. Each terminal 106 may communicate with one or multiple base stations on the forward and reverse links at any moment. A terminal may concurrently communicate with multiple base stations if "soft handoff" is supported by the network and if the terminal is actually in soft handoff.

Multiple base stations 104 are typically coupled to, and controlled by, one base station controller (BSC) 120. BSC 120 coordinates the communication for the base stations under its control. A position determining entity (PDE) 130 may be coupled to BSC 120 and used for position determination. PDE 130 may receive measurements from terminals 106 and may determine the positions of the terminals based on the received measurements, as described in further detail below.

For a CDMA network, each base station is assigned a pseudo-random noise (PN) sequence with a specific offset or starting time. This PN sequence is used by the base station to spectrally spread its data prior to transmission over the forward link. Each base station also transmits a pilot, which is simply a sequence of all ones (or all zeros) that is spectrally spread with the PN sequence assigned to the base station. The signal transmitted by each base station thus includes spectrally spread data and pilot.

For position determination, a pseudo-range to a given base station may be estimated based on the signal received by a terminal from the base station. The time of arrival of the signal at the terminal may be determined based on the phase of the PN sequence used by the base station for spreading. Since the pilot is typically processed to obtain this PN phase information, the measurement obtained by the terminal is often referred to as a "pilot phase" measurement (PPM). The pilot phase measurement is used to estimate the amount of time it takes the signal to propagate from the base station to the terminal. This propagation time may be converted to a pseudo-range, which includes the "true" or actual range between the terminal and the base station plus measurement errors.

In the following description, the term "time measurement" is used to denote a measurement that (1) is obtained based on a signal received from a transmitter (e.g., a base station) and (2) may be used to compute a pseudo-range to the transmitter. The time measurement may be a pilot phase measurement, a time of arrival (TOA) measurement, a round trip delay (RTD) measurement, or a time difference of arrival (TDOA) measurement. All of these different types of measurement are known in the art and not described herein.

As noted above, repeaters may be used to provide coverage for regions not covered by base stations, such as within buildings. Each repeater 114 couples to a "donor" base station 104, either directly or through another repeater, via a wireless or wireline link (e.g., a coaxial or fiber optic cable). On the forward link, a repeater receives a "donor" signal from the donor base station, conditions the donor signal to obtain a "repeated donor signal", and transmits the repeated donor signal via a "server" antenna to the terminals within its coverage area. On the reverse link, the repeater receives an "uplink" signal from the server antenna, conditions the uplink signal to obtain a "repeated uplink" signal, and sends the repeated uplink signal to the donor base station. The uplink signal includes reverse link signals transmitted by the terminals to the repeater. A repeater typically includes a hardware unit used to perform signal conditioning on the donor and uplink signals and the server antenna used to transmit the repeated donor signal to the terminals and receive the reverse link signals from the terminals. The server antenna and hardware unit may be located at different sites or co-located at the same site. In any case, the location of the server antenna is typically used as the location of the repeater.

Each repeater is associated with additional delays that include (1) transmission delays between the donor base station and the repeater and (2) internal delays due to circuitry within the repeater to receive, condition, and retransmit the signal from the donor base station. For example, surface acoustic wave (SAW) filters, amplifiers, and other components within the repeater introduce delays to the repeated donor signal transmitted by the repeater. In some instances, the additional delays may be comparable to, or possibly greater than, the transmission delays from the donor base station to the terminal. Thus, if the additional delays of the repeater are not taken into account, then the time measurement for the signal received by the terminal from repeater cannot be reliably used to determine the position of the terminal.

A method and apparatus is provided herein to perform position determination in a wireless communication network (e.g., a cellular network) with repeaters. The method and apparatus utilize a repeater database that contains various types of information for repeaters in the network, as described below. A position estimate for a terminal may be obtained based on (1) measurements made by the terminal, (2) information in the repeater database, and (3) other information that may be available.

Figure 2:
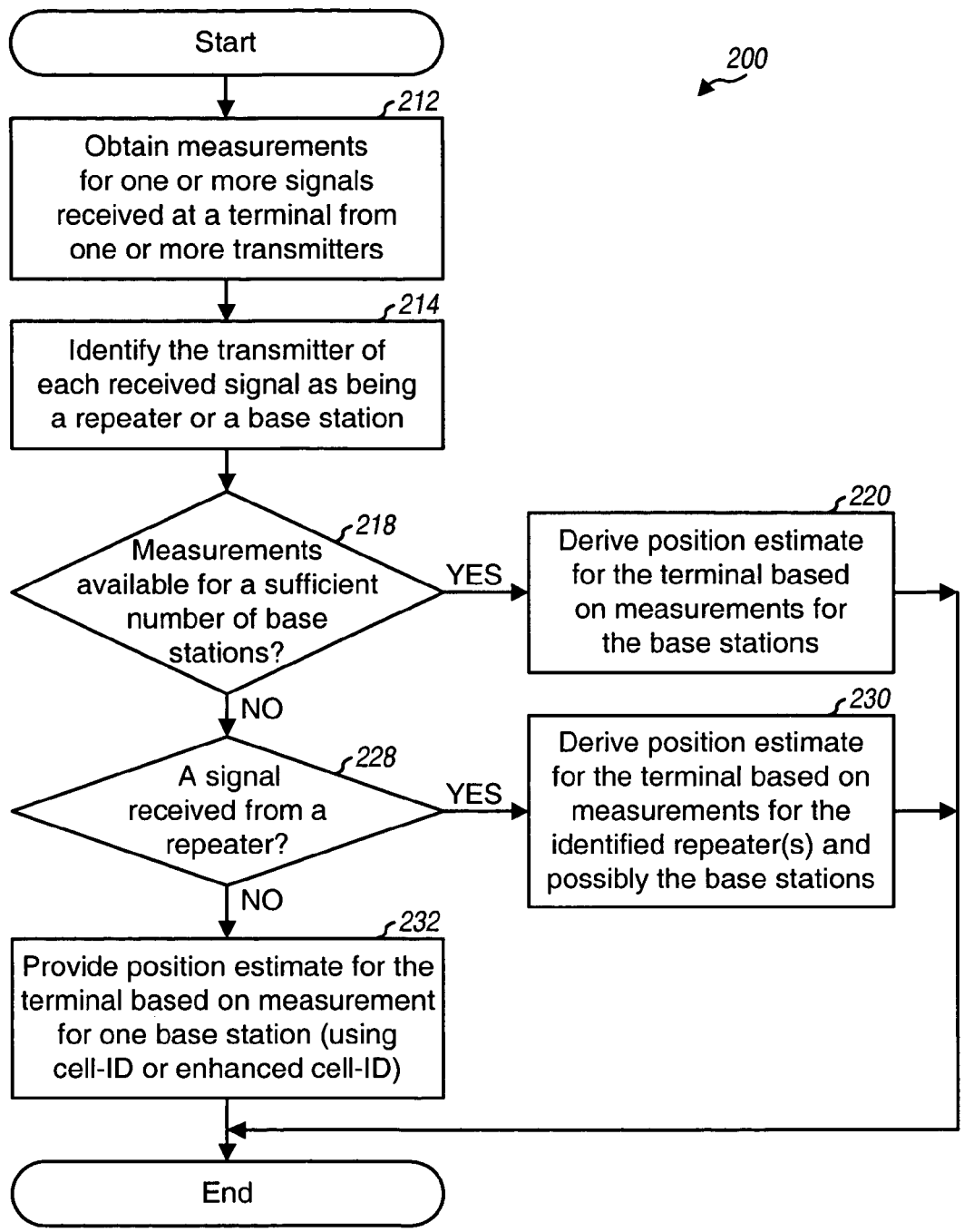
FIG. 2 shows a process for deriving a position estimate for a terminal based on signals received by the terminal from base stations and/or repeaters in the network.

FIG. 2 shows a flow diagram of an embodiment of a process 200 for deriving a position estimate for a terminal based on signals received by the terminal from base stations and/or repeaters in a cellular network. Process 200 may be performed by PDE 130 or some other network entity.

Initially, measurements are obtained for one or more signals received by the terminal from one or more transmitters in the network (step 212). Each received signal is from a different transmitter, which may be a base station or a repeater. One or multiple measurements may be obtained for each received signal. Each measurement may be a time measurement (e.g., a pilot phase measurement), a signal strength measurement, or some other type of measurement. For example, a time measurement and a signal strength measurement may be obtained for each received signal.

For each received signal, a determination is made whether the received signal is from a repeater or a base station (step 214). Step 214 is referred to as the repeater identification process and may be performed based on (1) the one or multiple measurements obtained for each received signal and (2) information in the repeater database. As part of the repeater identification process, if a signal is received from a repeater, then a determination may also be made whether it is an indoor repeater or an outdoor repeater. An indoor repeater is a repeater that is deployed within a building, and an outdoor repeater is one that is deployed outside a building. If the transmitter of a given received signal cannot be identified, then this signal may be discarded from use for position determination. The repeater identification process is described in detail below.

A determination is then made whether measurements for a sufficient number of base stations (e.g., three or more) are available (step 218). If the answer is yes, then a position estimate for the terminal is derived based solely on the measurements for the base stations (step 220). For step 220, the measurements for repeaters are discarded. Techniques for deriving the position estimate for the terminal based on measurements for base stations in a cellular network are known as Advanced Forward Link Trilateration (A-FLT), Observed Time Difference of Arrival (OTDOA), Enhanced Observed Time Difference (E-OTD), and Uplink Time of Arrival (U-TOA). In general, position determination can be performed by well know means such as, for example, the ones described in 3GPP 25.305, TIA/EIA/IS-801, and TIA/EIA/IS-817 standard documents, which are publicly available.

If the answer is no for step 218, then a determination is made whether or not a signal has been received from a repeater (step 228). If the answer is yes, then a position estimate for the terminal is derived based on measurements for the identified repeater and possibly measurements for base stations (step 230). Step 230 is described in further detail below.

Figure 3:
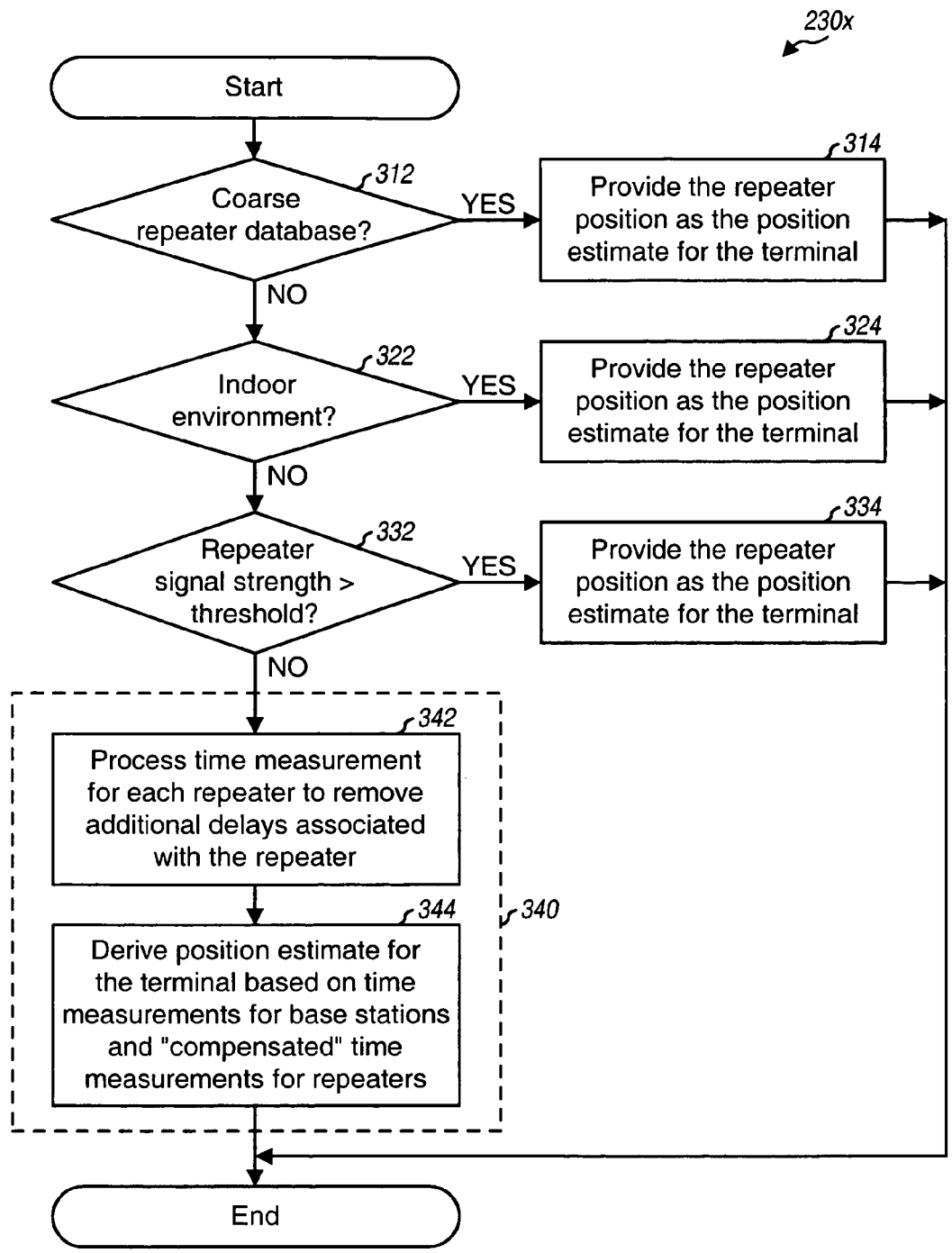
FIG. 3 shows a process for deriving a position estimate for a terminal that has received a signal from at least one repeater.

If the answer is no for step 228, then measurements for an insufficient number of base stations and measurements for no repeaters have been obtained from the terminal. In this case, the position of the terminal may be estimated based on measurements for the received base station(s) using a cell-ID or an enhanced cell-ID technique (step 232). The cell-ID technique provides the identity of the cell in which the terminal is deemed to be located based On the available measurements. The enhanced cell-ID technique provides the identity of the sector in which the terminal is deemed to be located. The accuracy of the cell-ID and enhanced cell-ID techniques is thus dependent on the size of the cell and sector, respectively, in which the terminal is deemed to be located. FIG. 3 shows a flow diagram of an embodiment of a process 230x for deriving a position estimate for a terminal that has received a signal from at least one repeater in the cellular network. Each of the at least one repeater is identified by the repeater identification process in step 214 in FIG. 2. Process 230x may be used for step 230 in FIG. 2.

Initially, a determination is made whether the repeater database contains "coarse" or "full" information for the at least one identified repeater (step 312). A description of what constitute coarse and full information is provided below. In summary, the repeater database is considered to contain coarse information for a given repeater if (1) a position and a position uncertainty are available for the repeater, and (2) pertinent delay information for the repeater is not available. If the repeater database contains coarse information for the at least one identified repeater, then one identified repeater is initially selected. If only one repeater has been identified, then the selected repeater is simply the single identified repeater. If multiple repeaters have been identified, then one of the identified repeaters (e.g., the repeater with the strongest received signal strength) is selected. The position of the selected repeater is then provided as the position estimate for the terminal (step 314). The process then terminates.

If the answer is no for step 312, then a determination is made whether the terminal is in an indoor or an outdoor environment (step 322). This determination may be made based on signals received from repeaters and/or other information that may be available. For example, the terminal may be deemed to be located indoor if a signal is received from at least one indoor repeater. The repeater identification process in step 214 in FIG. 2 may indicate whether an identified repeater is an indoor repeater or an outdoor repeater. The determination of the indoor/outdoor environment for the terminal is described in further detail below.

If the terminal is deemed to be located indoor, then the position of the selected repeater is provided as the position estimate for the terminal (step 324). For the indoor environment, the position of the repeater is typically sufficient as the position estimate for the terminal. Moreover, for the indoor environment, it may not be possible to obtain a more accurate position estimate for the terminal because the required number of signals from base stations and/or GPS satellites for trilateration may not be available.

If the terminal is not in an indoor environment, then a determination is made whether or not the strength or power of the signal received from any identified repeater exceeds a particular signal strength threshold (step 332). If the answer is yes, then the terminal is deemed to be located sufficiently close to this repeater. In this case, the position of the identified repeater with the strong received signal strength is provided as the position estimate for the terminal (step 334). The signal strength threshold may be selected based on various factors, as described in further detail below.

For steps 314, 324, and 334, the uncertainty of the position estimate for the terminal may be set equal to the position uncertainty for the identified repeater whose position is provided as the position estimate for the terminal. For example, for a repeater that covers a large building and is coupled to the donor base station via a leaky cable, a large position uncertainty may be associated with this repeater. In this case, a correspondingly large uncertainty may be used for the terminal position estimate that is set to this repeater position.

If the answer is no for step 332, then this indicates that (1) the terminal is not in an indoor environment, (2) a sufficiently strong signal was not received from any identified repeater, and (3) the repeater database includes pertinent delay information for the at least one identified repeater. In this case, a position estimate for the terminal may be derived based on (1) time measurements for signals received from base stations and (2) "compensated" time measurements for signals received from repeaters (block 340). The time measurement for the signal received from a repeater (i.e., as reported by the terminal) includes (1) transmission delays from the donor base station to the repeater, (2) internal delays of the repeater, and (3) propagation delays from the repeater to the terminal. A compensated time measurement for this repeater may be obtained by processing the time measurement for the repeater to remove the additional delays associated the repeater (step 342). The compensated time measurement for a given repeater i may be expressed as:

$$\tilde{p}_i = p_i - \tau_{int,i} - \tau_{br,i} \qquad \text{Eq(1)}$$

where $p_i$ is the time measurement reported by the terminal for repeater i;

$\tau_{int,i}$ is the internal delays for repeater i;

$\tau_{br,i}$ is the transmission delays from the donor base station to repeater i; and $\tilde{p}_i$ is the compensated time measurement for repeater i.

The additional delays for repeater i is the combination of the internal delays $\tau_{int,i}$ and the transmission delays $\tau_{br,i}$. A compensated time measurement may be obtained for each repeater for which the additional delays are known (i.e., available in the repeater database).

The compensated time measurement for a repeater may be used to derive a pseudo-range to the repeater. Correspondingly, the time measurement for a base station may be used to derive a pseudo-range to the base station. The position estimate for the terminal may then be derived based an (1) pseudo-ranges to the base stations and their locations and (2) pseudo-ranges to the repeaters and their locations (step 344). Step 344 may be performed using the A-FLT method. The process then terminates.

FIGS. 2 and 3 represent specific embodiments for performing position determination in a cellular network with repeaters. Various modifications may be made to the disclosed embodiments, and this is within the scope of the invention. For example, the steps for the process shown in FIG. 3 may be rearranged. As an example, block 340 may be moved between steps 312 and 322. In this case, the position estimate for the terminal may be derived using trilateration if at all possible (i.e., if time measurements and compensated time measurements can be obtained for a sufficient number of base stations and repeaters, respectively). Typically, pseudo-ranges to three or more transmitters are needed to derive the terminal position estimate using trilateration, where each transmitter may be a base station or a repeater. If pseudo-ranges to a sufficient number of transmitters are not available, then the position of an identified repeater may be provided as the terminal position estimate. As another example, steps 322 and 324 and/or steps 332 and 334 may be removed.

Some of the steps in FIGS. 2 and 3 are described in further detail below.

Repeater Identification

Various methods may be used to determine whether a signal received by a terminal is from a base station or a repeater. These methods include a legacy network method, a modulation method, and an identifier PN method.

For the legacy network method, the transmitter of each signal received by the terminal is identified, one signal at a time, based on measurements obtained for the signal and information available for the base stations and repeaters in the network. This method is iterative, and the transmitter for one received signal is identified in each iteration. Two embodiments of the legacy network method are described below—a coverage overlap method and a relative phase method.

The coverage overlap method identifies the transmitter of each received signal based on an identified coverage zone for the terminal (described below) and the coverage areas for a list of candidate transmitters for the signal being identified. Initially, the signal from the reference base station or repeater is identified from among all received signals. This may be achieved, for example, based on the PN offsets/sequences of the received signals, the arrival times of the received signals, the power levels of the received signals, some other measurements, or a combination thereof. For each iteration, one of the remaining received signals is selected for identification. For the first iteration, the identified coverage zone is set to the coverage area of the reference base station or repeater. For each subsequent iteration, the identified coverage zone is formed as a composite of the coverage areas of all base stations and repeaters that have been identified in previous iteration(s). The PN sequence of the signal to be identified in the current iteration is then determined. A list of base stations and repeaters assigned with this same PN sequence is next obtained. The coverage area of each base station and repeater in the list is then determined. The coverage area of a repeater may be obtained based on the repeater position and either a maximum antenna range (MAR) or a position uncertainty stored in the repeater database for the repeater. Each base station and repeater in the list is then evaluated. The base station or repeater with a coverage area that overlaps the identified coverage zone by the most is then selected as the transmitter of the signal being identified in the current iteration.

The relative phase method identifies the transmitter of each received signal based on the identified coverage zone for the terminal and time measurements for a list of candidate transmitters. Similar to the coverage overlap method, one of the received signals is selected for identification in each iteration. For each iteration, the identified coverage zone is obtained, the PN sequence of the signal to be identified in the current iteration is determined, and a list of candidate base stations and repeaters assigned with this PN sequence is obtained, as described above.

A delta time measurement ($\Delta p_i$) and a delta distance ($\Delta d_i$) are then computed for each candidate base station and repeater in the list. The delta time measurement for a given candidate transmitter i is the difference between the time measurement for the signal being identified ($p_i$) and the time measurement for a selected transmitter ($p_s$) (i.e., $\Delta p_i = p_i - p_s$). The selected transmitter may be any one of the base stations and repeaters identified in previous iterations. The delta distance for candidate transmitter i is the difference between (1) the distance from candidate transmitter i to the center of the identified coverage zone ($d_i$) and (2) the distance from the selected transmitter to the center of the identified coverage zone ($d_s$) (i.e., $\Delta d_i = d_i - d_s$). The distance $d_i$ is determined based on the position for candidate transmitter i, which may be obtained from the repeater database. Each base station and repeater in the list is evaluated. The base station or repeater with the delta time measurement closest to the delta distance (i.e., min ($\Delta p_i - \Delta d_i$)) is then selected as the transmitter of the signal being identified in the current iteration. A time measurement may be converted to distance by multiplication with the constant C for the speed of light, as is known in the art.

If delay information is available for a given candidate repeater, then the additional delays of this repeater is subtracted from the time measurement reported by the terminal to obtain the time measurement $p_i$ for the repeater. Conversely, if such delay information is not available for the candidate repeater, then the additional delays of the repeater may be estimated based on a round trip delay (RTD) measured at the candidate base station for the terminal. This RTD measurement is approximately twice the sum of (1) the distance from the donor base station to the repeater ($d_{br}$) and (2) the distance from the repeater to the terminal ($d_{rt}$) (i.e., $RTD/2 \cong d_{br} + d_{rt}$). For the distance $d_{rt}$, the terminal is estimated to be located at the center of the identified coverage zone. The distance $d_{br}$ is then subtracted from the time measurement reported by the terminal to obtain the time measurement $p_i$ for the repeater.

For the modulation method, the repeated uplink signal sent by a repeater to a donor base station on the reverse link is modified by the repeater to include an identifying signature. This signature may be in the form of identifiable changes in the amplitude, frequency, and/or delay of the uplink signal received at the server antenna of the repeater. For a delay modulation method, the repeated uplink signal sent by the repeater to the donor base station may include the uplink signal and one or more delayed versions of the uplink signal. Each delayed version may be generated by delaying the uplink signal by a specific amount of time. The signature for the terminal may be obtained in various manners. For example, the signature may be obtained based on (1) a specific set of delays for the delayed versions of the uplink signal, (2) a particular frequency used to switch between different delayed versions of the uplink signal, or (3) a particular pattern or code sequence for switching between delayed versions of the uplink signal.

For a frequency modulation method, the signature may be obtained by perturbing the carrier frequency of the repeated signal by a small amount in some specified manner. For an amplitude modulation method, the signature may be obtained by perturbing the amplitude of the repeated signal.

The repeated uplink signal from the repeater may be received and processed by the donor base station to detect the signature included in the repeated uplink signal by the repenter. The signature may be evaluated to ascertain the identity of the specific repeater that transmitted the repeated uplink signal. All reverse link signals included in this repeated uplink signal are then associated with the identified repeater.

For the identifier PN method, a repeater generates an identifier signal by spectrally spreading a pilot with a PN sequence assigned to the repeater. This PN sequence may be one of multiple PN sequences that have been specially reserved for repeater identification. The identifier signal may be added with the donor signal received on the forward link from a donor base station. The identifier signal is set at a sufficiently low power level (e.g., −15 dBc) so that it does not cause excessive interference to the donor signal. Moreover, the identifier signal may be delayed by the proper amount to allow the terminals to detect the identifier signal as being from a specific repeater. The repeated donor signal, which includes the donor signal and the identifier signal, is transmitted by the repeater to the terminals.

The repeated donor signal from the repeater is received and processed by a terminal to detect for the identifier signal. The detected identifier signal may then be evaluated to ascertain the identity of the specific repeater that transmitted the repeated donor signal.

Repeater Database

The completeness and accuracy of the repeater database have a large impact on the accuracy of the position estimates provided for terminals in the cellular network with repeaters. A complete and accurate repeater database is preferable. However, it may be difficult or impossible to assemble such a database. Depending on the type of information available for the repeaters in the network, the repeater database may be classified as either "coarse" or "full".

A coarse repeater database may contain all or some of the parameters listed in Table 1.

TABLE 1

| Parameter | Description |
| --- | --- |
| Repeater ID | A unique ID assigned to the repeater. |
| Corresponding PN | The PN offset/sequence assigned to the donor base station for the repeater. |
| Position and position uncertainty | The position of the repeater and the uncertainty of this position. The repeater position may be provided by a latitude, longitude, and altitude coordinate. |
| Indoor/outdoor indicator | Indicates whether the repeater is an indoor repeater or an outdoor repeater. |

The repeater ID may be any code that may be used to identify the repeater. For example, the repeater ID may correspond to the signature in the repeated uplink signal sent by the repeater to the donor base station (for the modulation method), the PN sequence used to generate the identifier signal (for the identifier PN method), and so on.

For the coarse repeater database, the repeater position may be coarse and may further be associated with a large position uncertainty. Thus, the coarse repeater database may be used for applications that only require a coarse position estimate for the terminal.

A full repeater database may contain all or some of the parameters listed in Table 2.

TABLE 2

| Parameter | Description |
| --- | --- |
| Repeater ID | A unique ID assigned to the repeater. |
| Corresponding PN | The PN offset/sequence assigned to the donor base station for the repeater. |
| Position and position uncertainty | The position and position uncertainty for the repeater. A more accurate version of the same parameters in the coarse repeater database. |
| Maximum antenna range (MAR) | The range, measured from the repeater server antenna, within which terminals are likely to receive the signal from the repeater. |

TABLE 2-continued

| Parameter | Description |
| --- | --- |
| Indoor/outdoor indicator | Indicates whether the repeater is an indoor repeater or an outdoor repeater. |

The parameters for repeaters in Table 2 are similar to the parameters for base stations in a base station almanac (BSA). The MAR may be used in the legacy network method to identify repeaters, as described above. The repeater position is more accurate and the position uncertainty is smaller for the full repeater database than the coarse repeater database. The more accurate position and smaller position uncertainty for the repeater may be provided as the position estimate for the terminal in steps 324 and 334 in FIG. 3.

For repeater identification and position determination methods that are affected by the additional delays of the repeaters, the full repeater database may also contain the parameters listed in Table 3.

TABLE 3

| Parameter | Description |
| --- | --- |
| Internal repeater delays | Delays caused by the repeater due to internal circuitry within the repeater. |
| Base station to repeater delays | Delays due to transmission of the donor signal from the donor base station to the repeater. The transmission may be over the air, via a coaxial or fiber cable, or by some other means. |

The internal repeater delays and the base station to repeater delays constitute the additional delays for the repeater. This delay information may be used in step 342 in FIG. 3 to obtain a compensated time measurement for the repeater, by removing the additional delays from the time measurement reported by the terminal.

For repeater identification and position determination methods that are affected by the strength or power of the signals transmitted by the repeaters, the full repeater database may also contain the parameters listed in Table 4.

TABLE 4

| Parameter | Description |
| --- | --- |
| Repeater server antenna information | Various types of information such as gain, orientation, horizontal beamwidth (antenna opening), vertical beamwidth, downtilt, and so on, of the repeater server antenna. |
| Donor base station to repeater path loss | The path loss from the donor base station to the repeater. For a repeater that communicates with the donor base station via a wireless link, the path loss may also be derived based on information for the donor antenna used to transmit the signal to the donor base station |
| Donor signal power | The power of the donor signal at the antenna of the donor base station. |

The parameters listed in Table 4 may be used to determine the power of the repeated donor signal transmitted by the repeater to the terminals.

Different repeater identification methods may rely on different types of information (e.g., delay or power information) to identify repeaters. Moreover, different position determination methods may also rely on different types of information to derive a position estimate for a terminal.

The repeater database may be such that (1) only coarse information is available for each repeater in the network or (2) full information is available for each repeater. The repeater database may also be "hybrid" such that coarse information is available for some repeaters and full information is available for other repeaters. For a hybrid repeater database, a coarse/full field may be provided for each repeater to indicate whether coarse or full information is available for the repeater. The position estimate for the terminal may be derived based on the coarse or full information available for each repeater received by the terminal.

The repeater database may be stored as a separate database or as part of the base station almanac. The base station almanac typically includes various types of information for the base stations in the network.

Indoor/Outdoor Repeater Determination

For the position determination process shown in FIG. 3, a distinction is made as to whether the terminal is in an indoor or an outdoor environment. This is because different procedures are used in FIG. 3 to derive the position estimate for the terminal depending on whether it is deemed to be located indoor or outdoor.

The environment of the terminal may be ascertained in various manners. In one embodiment, an indoor/outdoor field is included in the repeater database for each repeater. This field is used to indicate whether the repeater is an indoor repeater or an outdoor repeater. For each repeater in the database, this field may be filled with the indoor/outdoor information for the repeater, if such information is known, or may be left blank otherwise. The indoor/outdoor information for a given repeater may be obtained when the repeater is deployed or when a survey is made of the repeaters in the network. The terminal may be deemed to be located indoor if a signal from an indoor repeater is received by the terminal. Otherwise, the terminal may be deemed to be located outdoor.

In another embodiment, the determination as to whether the terminal is located indoor or outdoor is made based on the number of signals received by the terminal. For example, since signals from GPS satellites typically cannot be received within buildings, or may be received at very low power levels, the terminal may be deemed to be located indoor if no signals or only a few signals are received from GPS satellites. The terminal may also be deemed to be located indoor if (1) the received signal strength for GPS satellites is low and/or (2) the angle of visible GPS satellites is high (i.e., the satellite is high in the sky). Similarly, the terminal may be deemed to be located indoor based on the number of signals received from base stations and/or the received signal strength for the base stations.

Signal Strength Threshold

For the position determination process shown in FIG. 3, if the terminal is located outdoor but sufficiently close to a repeater, then the position of the repeater is provided as the position estimate for the terminal (steps 332 and 334). The determination as to whether or not the terminal is located sufficiently close to the repeater may be made by comparing the received signal strength for the repeater against the signal strength threshold. This threshold may be set in various manners.

In one embodiment, the threshold for a given repeater is set to the signal strength expected to be received by the terminals at a particular range from the repeater. For example, the threshold may be set based on requirements specified in a report and order for enhanced 911 (E-911) that has been adopted by the Federal Communications Commission (FCC). This FCC mandate requires the location of the terminal, for handset-based technologies, to be accurate to within 50 meters for 67% of calls and within 150 meters for 95% of calls. The threshold may then be set to the signal strength expected to be received by terminals located at either 50 or 150 meters from the repeater, depending on the desired uncertainty in the reported position estimate for the terminal. The threshold may also be set to the worst-case (i.e., the weakest) power predicted at 50 or 150 meters away from the repeater. The signal strength threshold is typically selected to be higher than an add threshold conventionally used to add a new base station to a candidate set for the terminal. The candidate set includes all base stations whose signals are received by the terminal with sufficient strength and which may be selected to transmit data to the terminal. Some exemplary values that may be used for the signal strength threshold are −6 dB, −10 dB, and −13 dB. Other values may also be used for the threshold, and this is within the scope of the invention.

The same threshold may be used for all repeaters in the network. Alternatively, different thresholds may be used for different repeaters. In this case, the threshold used for each repeater may be set based on the power level of the repeated donor signal at the repeater server antenna. This output power level may be ascertained based on the server antenna and path loss information (e.g., shown in Table 4) stored in the database for the repeater. A threshold field may also be included in the repeater database for each repeater. This field may be used to store the signal strength threshold for the repeater.

Network Entities

Figure 4:
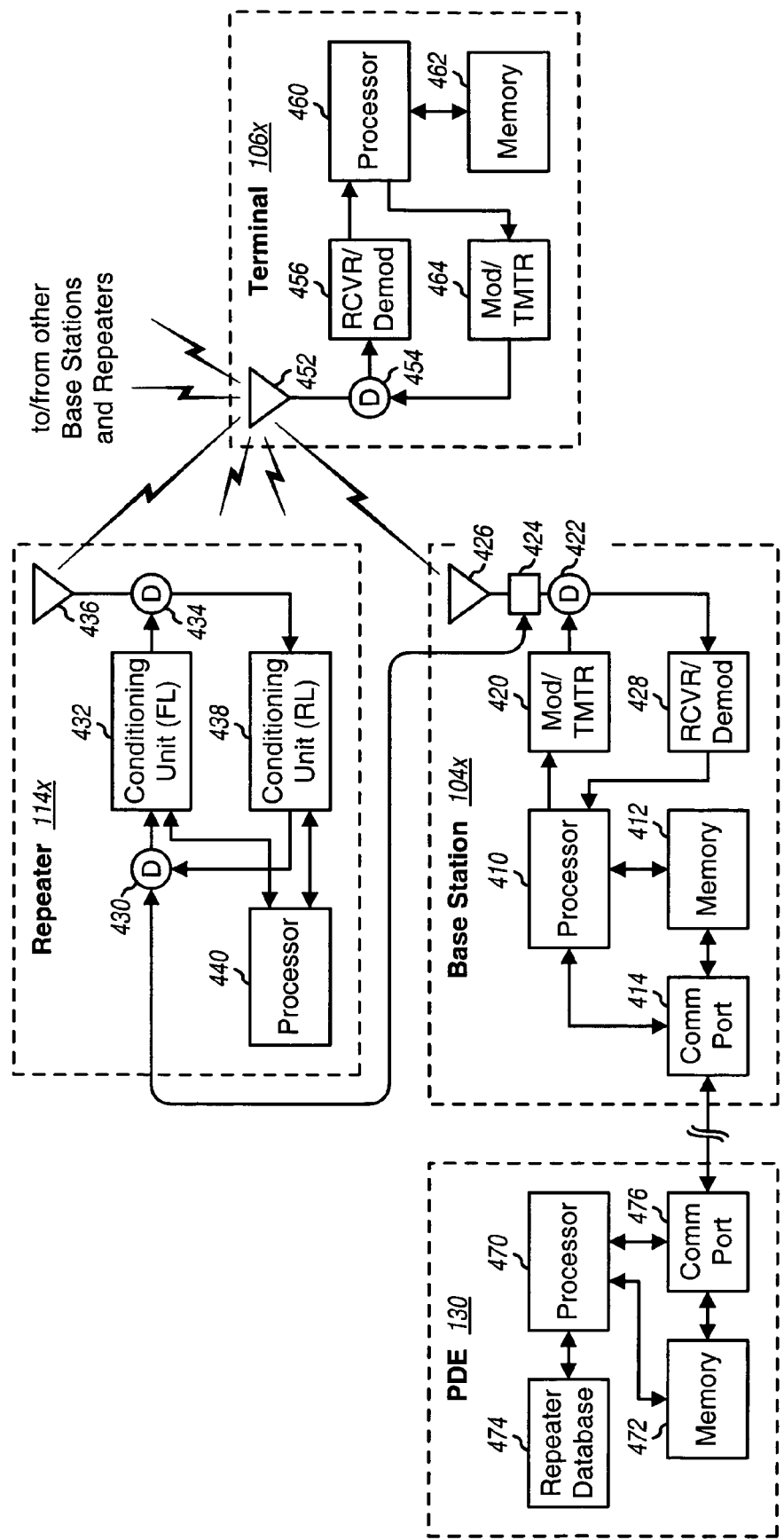
FIG. 4 shows a block diagram of a base station, a repeater, a terminal, and a position determining entity (PDE) in the network.

FIG. 4 shows a block diagram of an embodiment of a base station 104x, a repeater 114x, a terminal 106x, and PDE 130 within network 100. Base station 104x is an exemplary base station in the network, repeater 114x is an exemplary repeater, and terminal 106x is an exemplary terminal. Terminal 106x may be a cellular telephone, a handset, a computer with a wireless modem, or some other unit. Base station 104x operatively couples to PDE 130 via BSC 120, which is not shown in FIG. 4 for simplicity.

On the forward link, base station 104x transmits pilot, data, and signaling to the terminals within its coverage area. These various types of data are processed (e.g., coded, modulated, filtered, amplified, and frequency upconverted) by a modulator/transmitter (Mod/TMTR) 420 to provide a forward link signal. The forward link signal is routed through a duplexer 422, processed by a splitter unit 424, and transmitted via an antenna 426 to the terminals within the coverage area of base station 104x.

Repeater 114x receives the forward link signal from splitter unit 424 within donor base station 104x. Within repeater 114x, the forward link signal is routed through a duplexer 430, conditioned by a conditioning unit (FL) 432, routed through a duplexer 434, and transmitted via an antenna 436 to the terminals within the coverage area of repeater 114x. Antenna 436 is the server antenna for the repeater. A processor 440 is connected to the conditioning unit (FL) 432 and also connected to the conditioning unit (RL) 438.

Terminal 106x receives forward link signals from zero or more base stations (such as base station 104x) and zero or more repeaters (such as repeater 114x) at an antenna 452. The receiver input signal from antenna 452 may thus include a number of forward link signals received from a number of transmitters, where each transmitter may be a base station or a repeater. The receiver input signal is routed through a duplexer 454 and processed by a receiver/demodulator (RCVR/Demod) 456 to provide various types of information that may be used for repeater/base station identification and position determination. In particular, RCVR/Demod 456 may provide a time measurement and a signal strength measurement for each forward link signal detected in the receiver input signal. RCVR/Demod 456 may implement a rake receiver that is capable of concurrently processing multiple signal instances (or multipath components) for multiple base stations and repeaters. The rake receiver includes a number of demodulation processors (or "fingers"), each of which may be assigned to process and track a particular multipath component.

On the reverse link, terminal 106x may transmit data, pilot, and/or signaling to the reference base station (e.g., base station 104x). For example, terminal 106x may send back the time and signal strength measurements made on the forward link signals received by the terminal. The various types of data are processed by a modulator/transmitter (Mod/TMTR) 464 to provide a reverse link signal, which is then routed through duplexer 454 and transmitted from antenna 452.

Repeater 114x may receive the reverse link signal from terminal 106x at antenna 436. The receiver input signal from antenna 436 is routed through duplexer 434, conditioned by a conditioning unit (RL) 438, routed through duplexer 430, and sent to donor base station 104x. The processor 440 is connected to the conditioning unit (FL) 432 and also connected to the conditioning unit (RL) 438.

Base station 104x may also receive the reverse link signal from terminal 106x at antenna 426. The receiver input signal from antenna 426 is passed through splitter unit 424, routed through duplexer 422, and provided to a receiver/demodulator (RCVR/Demod) 428. RCVR/Demod 428 then processes the receiver input signal in a complementary manner to provide various types of information, which may then be provided to a processor 410. For example, RCVR/Demod 428 may recover the time and signal strength measurements sent by terminal 106x. RCVR/Demod 428 may also provide time and signal strength measurements made on the reverse link signal received from terminal 106x.

For the embodiment shown in FIG. 4, a communication (Comm) port 414 within base station 104x operatively couples (e.g., via BSC 120) to a communication port 476 within PDE 130. Communication ports 414 and 476 allow base station 104x and PDE 130 to exchange pertinent information for repeater/base station identification and position determination. Some of this information may be measurements received from terminal 106x.

In general, the identification of repeaters and base stations and the determination of the terminal position, as described above, may be performed by terminal 106x, base station 104x, PDE 130, or some other network entity. The entity performing the repeater/base station identification and/or the position determination is provided with the pertinent information. Such information may include, for example, a list of forward link signals received by terminal 106x, time and signal strength measurements for these forward link signals, pertinent information from the repeater database, and so on.

The processing to identify the repeaters and base stations for the forward link signals received by terminal 106x and to derive the position estimate for the terminal may be performed by a processor 460 within terminal 106x, processor 410 within base station 104x, or a processor 470 within PDE 130. Memory units 462, 412, and 472 may be used to store various types of information used for repeater/base station and position determination. This information may include, for example, the list of forward link signals received by terminal 106x, time and signal strength measurements for these signals, pertinent information from the repeater database and base station almanac, and so on. Memory units 412, 462, and 472 may also store program codes and data for processors 410, 460, and 470, respectively. A repeater database 474 within PDE 130 may be used to store information for the repeaters in the network, such as information for the parameters listed in Tables 1 through 4 described above. The base station almanac may be stored within database 474 or memory 472.

The method and apparatus described herein may be implemented by various means, such as in hardware, software, or a combination thereof. For a hardware implementation, the method and apparatus may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the method described herein may be implemented with modules (e.g., procedures, functions, and so on) that perform the functions described herein. The software codes may be stored in a memory unit (e.g., memory unit 412, 462, or 472 in FIG. 4) and executed by a processor (e.g., processor 410, 460, or 470). The memory unit may be implemented within the processor or external to the processor, in which case it can be communicatively coupled to the processor via various means as is known in the art.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of performing position determination in a wireless communication network with repeaters, wherein the repeater includes circuitry that causes internal repeater delays, and additional delays are defined responsive to the internal repeater delays and the transmission time from the base station to the repeater, and wherein information for additional delays associated with the repeater is available, comprising:
   identifying a signal received by a wireless terminal as being from a repeater;
   obtaining a position of the repeater;
   processing a time measurement for the repeater to remove the additional delays associated with the repeater;
   deriving a more accurate position estimate for the terminal based on the time measurement for the repeater, with the additional delays removed, and time measurements for at least two additional transmitters received by the terminal; and
   providing the position of the repeater as a position estimate for the terminal if a more accurate position estimate for the terminal cannot be obtained.

2. The method of claim 1, further comprising:
   providing a position uncertainty for the repeater as an uncertainty in the position estimate for the terminal if the more accurate position estimate for the terminal cannot be obtained.

3. The method of claim 1, wherein the more accurate position estimate for the terminal cannot be obtained due to lack of a required number of measurements to perform trilateration for the terminal.

4. The method of claim 1, further comprising:
   determining whether the terminal is in an indoor or an outdoor environment; and
   providing the position of the repeater as the position estimate for the terminal if the terminal is deemed to be in an indoor environment.

5. The method of claim 4, wherein the terminal is deemed to be in an indoor environment if the repeater is an indoor repeater.

6. The method of claim 1, further comprising:
   comparing received signal strength for the repeater against a threshold; and
   providing the position of the repeater as the position estimate for the terminal if the received signal strength exceeds the threshold.

7. The method of claim 6, wherein the threshold is set based on an expected received signal strength for the repeater at a particular range from the repeater.

8. The method of claim 1, wherein the identifying is based on a pseudo-random number (PN) sequence used for the signal received from the repeater.

9. The method of claim 1, wherein the identifying is based on modulation characteristics of the signal received from the repeater.

10. The method of claim 1, wherein the identifying is based on a time measurement obtained at the terminal for the signal received from the repeater.

11. The method of claim 1, wherein the identifying is based on a signal strength measurement obtained at the terminal for the signal received from the repeater.

12. The method of claim 1, wherein the wireless communication network is a CDMA network.

13. A method of performing position determination in a wireless communication network with repeaters, comprising:
   identifying a signal received by a wireless terminal as being from a repeater;
   obtaining a position of the repeater; and
   providing the position of the repeater as a position estimate for the terminal if a more accurate position estimate for the terminal cannot be obtained;
   wherein the repeater includes circuitry that causes internal repeater delays, and additional delays are defined responsive to the internal repeater delays and the transmission time from the base station to the repeater, and wherein the more accurate position estimate for the terminal cannot be obtained due to lack of information for additional delays associated with the repeater.

14. A method of performing position determination in a wireless communication network with repeaters, comprising:
   identifying a signal received by a wireless terminal as being from a repeater;
   obtaining a position of the repeater;
   providing the position of the repeater as a position estimate for the terminal if a more accurate position estimate for the terminal cannot be obtained;

determining whether the terminal is in an indoor or an outdoor environment based on the number of signals received by the terminal from satellites and base stations; and providing the position of the repeater as the position estimate for the terminal if the terminal is deemed to be in an indoor environment.

15. An apparatus in a wireless communication network with repeaters, comprising:

means for identifying a signal received by a wireless terminal as being from a repeater;

means for obtaining a position of the repeater;

means for providing the position of the repeater as a position estimate for the terminal if a more accurate position estimate for the terminal cannot be obtained;

wherein the repeater includes circuitry that causes internal repeater delays, and additional delays are defined responsive to the internal repeater delays and the transmission time from the base station to the repeater, and further comprising:

means for processing a time measurement for the repeater to remove additional delays associated with the repeater; and means for deriving the more accurate position estimate for the terminal based on the time measurement for the repeater, with the additional delays removed, and time measurements for at least two additional transmitters received by the terminal.

16. The apparatus of claim 15, further comprising:

means for determining whether the terminal is in an indoor or an outdoor environment; and means for providing the position of the repeater as the position estimate for the terminal if the terminal is deemed to be in an indoor environment.

17. The apparatus of claim 15, further comprising:

means for comparing received signal strength for the repeater against a threshold; and means for providing the position of the repeater as the position estimate for the terminal if the received signal strength exceeds the threshold.

18. A program stored on a computer-readable medium, the program comprising executable instructions to:

identify a signal received by a wireless terminal as being from a repeater;

obtain a position of the repeater; and provide the position of the repeater as a position estimate for the terminal if a more accurate position estimate for the terminal cannot be obtained;

determine whether the terminal is in an indoor or an outdoor environment based on the number of signals received by the terminal from satellites and base stations; and provide the position of the repeater as the position estimate for the terminal if the terminal is deemed to be in an indoor environment; environment.

19. A device in a wireless communication network with repeaters, comprising:

a memory unit operative to store a database of information for the repeaters in the network; and a processor operative to identify a signal received by a wireless terminal as being from a repeater, obtain a position of the repeater from the database, provide the position of the repeater as a position estimate for the terminal if a more accurate position estimate for the terminal cannot be obtained; determine whether the terminal is in an indoor or an outdoor environment based on the number of signals received by the terminal from satellites and base stations, and provide the position of the repeater as the position estimate for the terminal if the terminal is deemed to be in an indoor environment.

20. An apparatus for performing position determination in a wireless communication network with repeaters, comprising:

means for identifying a signal received by a wireless terminal as being from a repeater;

means for obtaining a position of the repeater;

means for providing the position of the repeater as a position estimate for the terminal if a more accurate position estimate for the terminal cannot be obtained;

means for determining whether the terminal is in an indoor or an outdoor environment based on the number of signals received by the terminal from satellites and base stations; and means for providing the position of the repeater as the position estimate for the terminal if the terminal is deemed to be in an indoor environment.

* * * * *